(No Model.)
C. HODGKINS.
HARROW.
No. 361,698. Patented Apr. 26, 1887.
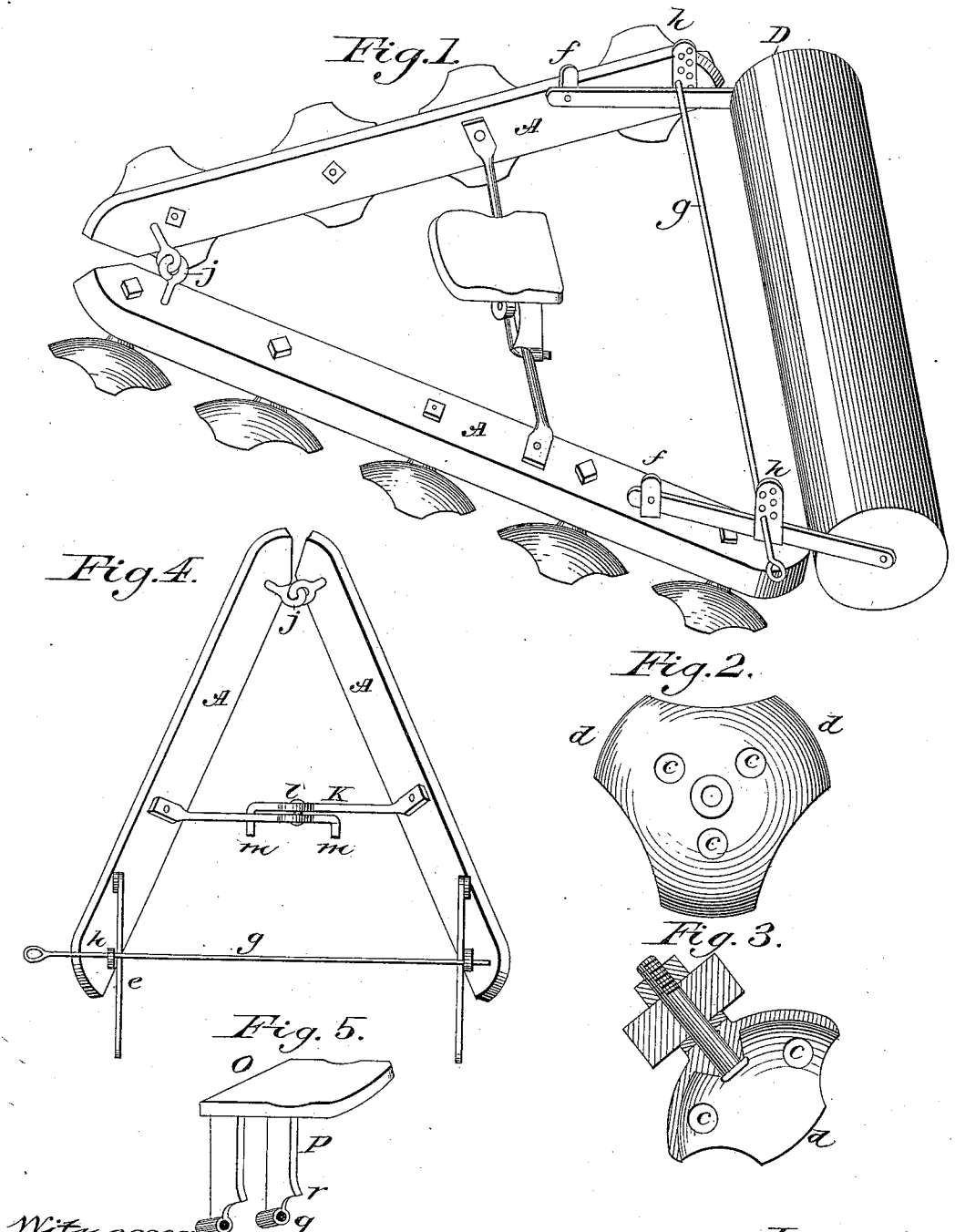

UNITED STATES PATENT OFFICE.

CHRISTOPHER HODGKINS, OF MARLBOROUGH, NEW HAMPSHIRE.

HARROW.

SPECIFICATION forming part of Letters Patent No. 361,698, dated April 26, 1887.

Application filed January 3, 1887. Serial No. 223,280. (No model.)

*To all whom it may concern:*

Be it known that I, CHRISTOPHER HODGKINS, a citizen of the United States, residing at Marlborough, in the county of Cheshire and State of New Hampshire, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in harrows in which revolving concavo-convex disks are mounted obliquely on triangular bars in place of ordinary harrow-teeth.

The objects of my invention are to provide a harrow, first, which will thoroughly stir up and pulverize the soil and leave the surface of the ground comparatively level after it has passed over the same; second, which shall be of light draft and capable of being regulated so as to cut or stir up the soil to a greater or less depth, as desired; third, which can be folded into a small compass for transportation or storage. I attain these objects by the mechanism illustrated in the accompanying drawings, in which—

Figure 1 is a perspective view of my harrow as it appears when ready for use. Fig. 2 is a view of the scalloped concavo-convex disk; Fig. 3 is a section of the disk, showing its connection with the frame. Fig. 4 is a top view of the frame with the seat and regulating-roller detached. Fig. 5 represents the detachable seat removed from the cross-brace of the triangular frame.

Similar letters refer to similar parts throughout the several views.

The frame is V-shaped, like the ordinary tooth-harrow. The bars A A, however, instead of being on a plane with each other, are set obliquely and incline inwardly at an angle of about forty-five degrees. On the under side of these bars are mounted disks, so as to revolve on a plane parallel with the face of the bars. They are set on bearings $b$, bolted to the bars A. These disks, which may be constructed of wrought or cast iron, vary in thickness from one-fourth to three-sixteenths of an inch and from ten to twelve inches in diameter at their widest part. They are concavo-convex in shape, and may be perforated with three or more holes, $c$, around the axle or bearing, for the purpose of decreasing their weight and to prevent the inside of the disk from clogging with soil. The disk is scalloped, so as to form three shovel-like projections, $d$, with sharp edges, around its periphery. These projections are ordinarily about three inches in width at their outer edges, and from thence slope backward, so as to increase the width of the blade. When in operation these shovels or projections, by reason of their peculiar shape and the angle on which they run, cut through the sod or soil and lift up a portion on the inside of the shovel, which drops again by its own weight as soon as the next shovel enters the soil. Thus by the united operation of these shovels the soil is thoroughly cut and stirred up. The process of lifting the soil, as above described, tends to level any minor depressions in the ground, and leaves the same comparatively level and smooth.

Directly behind the harrow is placed the adjustable roller D. This runs in bearings at the ends of the movable arms $e$ $e$, which are hinged at the posts $f$ $f$, so that the roller may be raised or lowered, as desired. The roller is of sufficient diameter, so that the rear end of the harrow may be raised or lowered and kept in position on the arms $e$ $e$, by means of the adjusting-rod $g$, passing through the graduating-posts $h$ $h$ above the arms $e$ $e$. In soft or light soil the rear end of a harrow has a tendency to cut too deep, and this defect is easily remedied by the roller attachment above described. The roller also serves to further smooth the ground after the harrow has done its work.

The bars A A are hinged, first, at the fore end or point of the harrow by the double eye-bolt $j$, and, second, at the center of the cross-brace K, at $l$. This device allows the harrow-frame to be closed up in a compact form for transportation or storage after the roller D, adjusting-rod $g$, and the seat, hereinafter described, are removed.

The cross-brace K consists of two parts made of iron rods, and hinged at its center, at $l$. The rods extend beyond the hinge a convenient length, then turn back horizontally and at right angles with the cross-brace, this forming the seat-pins $m\ m$, on which the seat O is attached. The seat is provided with two upright legs, $p\ p$, which terminate in clasp-rings $q\ q$, by which the seat is attached to the pins $m\ m$. On the front side of the legs project the shoulders $r\ r$. These extend over and rest closely upon the rods composing the cross-brace K, and thus bind the cross-bar together and keep the harrow-frame firmly in position.

Having described my invention, I claim—

1. A harrow with a triangular frame composed of two bars inclining inwardly at an angle of forty-five degrees, on which are mounted scalloped concavo convex revolving disks and having an adjustable roller attached thereto, by means of which the rear end of the harrow may be raised or lowered at will, all constructed to operate substantially as and for the purposes specified.

2. The revolving concavo-convex disk having its periphery scalloped, so as to form three shovel-like projections with sharp edges, constructed substantially as set forth, for the purposes specified.

3. The cross-brace K, hinged at its center and composed of two rods, the ends of which form the pins $m\ m$, for the purpose of attaching the seat thereto and confining the cross-bar, substantially as and for the purposes set forth.

4. The seat O, provided with legs $p\ p$, shoulders $r\ r$, and ring-sockets $q\ q$, substantially as and for the purposes specified.

5. In a harrow, the combination of the concavo-convex disk, constructed as set forth, with the bars A A, set at an angle of forty-five degrees, substantially as specified.

6. In a harrow, the combination of the attachable seat O with the cross-brace K, substantially as and for the purposes set forth.

In testimony whereof I affix my signature in presence of two witnesses.

CHRISTOPHER HODGKINS.

Witnesses:
HIRAM BLAKE,
ADOLPH PRESSLER.